United States Patent
Massoulie et al.

(10) Patent No.: US 8,424,937 B2
(45) Date of Patent: Apr. 23, 2013

(54) AUTOMOBILE BODY INCLUDING A BEARING FOR A BUMPER-FORMING MEMBER AND AN AIR INTAKE DUCT TO THE ENGINE

(75) Inventors: Juliette Massoulie, Gambais (FR); Christophe Audoux, Richebourg (FR); Philippe Bogaert, Les Mesruls (FR)

(73) Assignee: Renault S.A.S., Boulogne-Billancourt (FR)

( * ) Notice: Subject to any disclaimer, the term of this patent is extended or adjusted under 35 U.S.C. 154(b) by 262 days.

(21) Appl. No.: 12/990,072

(22) PCT Filed: Apr. 9, 2009

(86) PCT No.: PCT/FR2009/050641
§ 371 (c)(1),
(2), (4) Date: Mar. 7, 2011

(87) PCT Pub. No.: WO2009/136094
PCT Pub. Date: Nov. 12, 2009

(65) Prior Publication Data
US 2011/0148153 A1  Jun. 23, 2011

(30) Foreign Application Priority Data

Apr. 28, 2008  (FR) .................................... 08 02378

(51) Int. Cl.
*B60R 19/48* (2006.01)
(52) U.S. Cl.
USPC ........................................................ 293/117

(58) Field of Classification Search .................. 293/117, 293/113; 296/208, 193.02, 204; 29/428; 180/68.1, 69.3, 68.4
See application file for complete search history.

(56) References Cited

U.S. PATENT DOCUMENTS

| 4,706,615 A * | 11/1987 | Scadding ................... 123/41.01 |
| 6,540,802 B2 | 4/2003 | Trautmann et al. |
| 7,721,699 B2 * | 5/2010 | Delgado .................. 123/184.53 |
| 2004/0108152 A1 | 6/2004 | Storz et al. |
| 2006/0102109 A1 * | 5/2006 | Becker et al. ............. 123/41.48 |
| 2010/0147611 A1 * | 6/2010 | Amano et al. .............. 180/68.1 |

(Continued)

FOREIGN PATENT DOCUMENTS

| EP | 0 535 406 | 4/1993 |
| EP | 1 426 224 | 7/2006 |
| EP | 1 847 446 | 10/2007 |
| FR | 2 906 191 | 3/2008 |

OTHER PUBLICATIONS

International Search Report issued Oct. 21, 2009 in PCT/FR09/050641 filed Apr. 9, 2009.

*Primary Examiner* — Kiran B Patel
(74) *Attorney, Agent, or Firm* — Oblon, Spivak, McClelland, Maier & Neustadt, L.L.P.

(57) ABSTRACT

An automobile body for receiving a bumper-forming member and including: a front crossbar; a pair of bearings for the bumper-forming member; and an air intake duct into the engine, the duct including an open end through which the outside air enters the duct. One of the bearings includes a protection portion of the open end, wherein the protection portion is provided in close proximity to the open end, covers the open end, and extends along a portion of the duct, while a gap is provided between the protection portion and the duct so that the air can flow into the duct through the open end.

10 Claims, 2 Drawing Sheets

U.S. PATENT DOCUMENTS

2010/0282533 A1* 11/2010 Sugiyama .................... 180/68.1
2012/0024611 A1* 2/2012 Ajisaka ....................... 180/68.1
2012/0161473 A1* 6/2012 Schaefer .................. 296/187.09

* cited by examiner

AUTOMOBILE BODY INCLUDING A BEARING FOR A BUMPER-FORMING MEMBER AND AN AIR INTAKE DUCT TO THE ENGINE

The present invention relates to a motor vehicle body.

The engine of motor vehicles is supplied with combustion air by an air intake duct. This duct is connected to the engine and has an open end through which air from outside enters. The open end of this air intake duct is generally positioned at the front of the vehicle, above the front crossmember of the body, behind the bumper-forming element that protects the crossmember.

One of the problems encountered is the presence of water in the incoming air. Thus, certain air intake ducts have devices for separating the air and the water, like the one described in document U.S. Pat. No. 6,540,802, for example.

Another problem that arises is the massive and direct ingress of water into the air intake duct in situations of heavy rain, when driving through a ford or through too large a puddle. Under such circumstances, the separation device is completely ineffective and there is a risk that the engine will become flooded.

Hence, one problem that arises and that the present invention intends to address is that of providing a motor vehicle body which has an engine air intake duct and is able to protect this duct from direct ingress of water.

With a view to addressing this problem, the present invention provides a motor vehicle body having a front end and intended to accept a bumper-forming element able to protect said front end, said body comprising:

a front crossmember arranged transversely to said body, and defining said front end;

a pair of mounts for said bumper-forming element, said mounts being fixed some distance apart, on said front crossmember, and each comprising a mounting part which extends in front of said crossmember and serves to support said bumper-forming element; and an engine air intake duct, said duct comprising an open end via which air from outside enters said duct.

According to the invention, one of said mounts for said bumper-forming element comprises a protective portion protecting said open end, said protective portion is arranged in the immediate vicinity of said open end, said protective portion covers said open end and extends along a portion of said duct, and a space is left between said protective portion and said duct so as to allow air to enter said duct via said open end.

What is meant, within the meaning of the present invention, by "immediate vicinity of" is that the protective portion is at most a distance of the order of 150 mm away from the open end of the duct.

The positioning of the open end of the duct and therefore that of the protective portion do not impose limitations on the invention. Hence, the open end may be positioned facing the front of the vehicle. Specifically, because the open end is close to the mount for the bumper-forming element (or even inserted in a portion thereof), it is relatively distant from the openings formed in the bumper-forming element which are liable to allow water in. The bumper-forming element therefore represents a first obstacle to the water, which is not the case when the open end is positioned directly at an opening in the bumper-forming element, as it is in the prior art.

In one particular embodiment, the front crossmember has an upper face facing toward the interior of a motor vehicle, and said open end faces toward said upper face. This substantially vertical position of the duct portion comprising the open end, with respect to the crossmember and to the body, is indeed beneficial in avoiding ingress of water into the duct through the open end thereof.

According to one particular embodiment of the protective portion, said duct has an end connected to the engine, said protective portion has an end wall positioned above said open end and an edge-forming wall connected to said end wall, and said edge-forming wall extends along said duct, beyond said open end, in the direction of said end connected to the engine. Nonetheless, the invention is not restricted to this embodiment. In particular, the distinction between the end wall and the edge-forming wall or walls may not be a marked one.

According to one particular embodiment, the minimum distance H separating said end wall from said open end is greater than 0.8 times the diameter of said duct.

According to one embodiment which may be combined with the previous embodiment, the distance E separating said edge-forming wall from said duct is greater than half the diameter of said duct.

The applicant company has demonstrated that such values, whether or not they are combined, are effective in avoiding any direct and massive ingress of water into the air intake duct.

Other particulars and advantages of the invention will become apparent through reading the description given hereinafter of one specific embodiment of the invention, given by way of non-limiting indication and with reference to the attached drawings in which.

Figure 1:
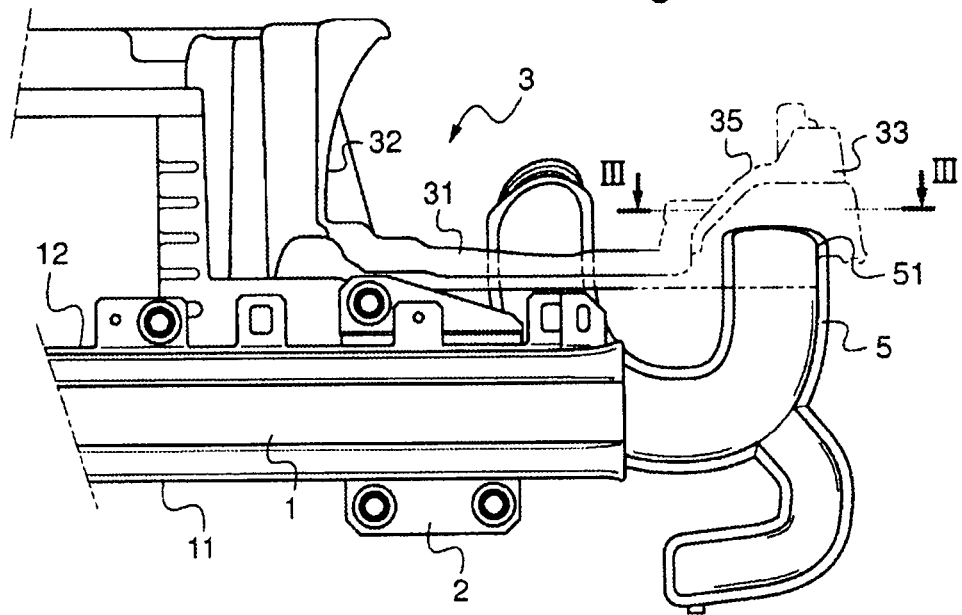
FIG. 1 depicts a partial front view of the front part of the body according to the invention.

FIG. 1 depicts a front view of the front part of the body of the invention. The body according to the invention comprises a front crossmember 1 which extends transversely to the body and defines the front end of the body. The front crossmember 1 has a lower face 11, intended to face toward the ground, when the body is mounted on a motor vehicle, and an upper face 12, opposite the lower face 11, and intended to face toward the roof of the interior of this same vehicle. The end of a chassis frame side rail 2 is attached to the front crossmember 1. This chassis frame side rail 2 defines the length of the body.

The body 1 also comprises a mount 3 for a bumper-forming element. This mount 3 is mounted on the upper face 12 of the crossmember 1 and has a longitudinal portion 31 extending parallel to the front crossmember 1 and two lateral portions 32 and 33 arranged one at each end of the longitudinal portion 31. The first lateral portion 32 is attached to the front crossmember 1 and extends perpendicular to the latter and perpendicular to the chassis frame side rail 2; this first lateral portion 32 protrudes above the upper face 12 of the crossmember 1. The second lateral portion 33 is positioned beyond an end of the front crossmember 1. This second lateral portion 33 extends the crossmember 1 longitudinally and serves to support the walls of sides 41 of the bumper-forming element 4 (see FIG. 2). The second lateral portion 33 comprises a mounting part which extends forward of the crossmember (in the direction away from the chassis frame side rail 2) and which will be described in greater detail with reference to FIG. 2.

As depicted in FIG. 1, the body also comprises an engine air intake duct 5. This duct 5 has an open end 51 which is inserted in a protective portion 35 formed in the mount 3, at the second lateral end 33. This protective portion 35 forms a cap over the open end 51 and will be described more fully with reference to FIG. 3.

Figure 2:
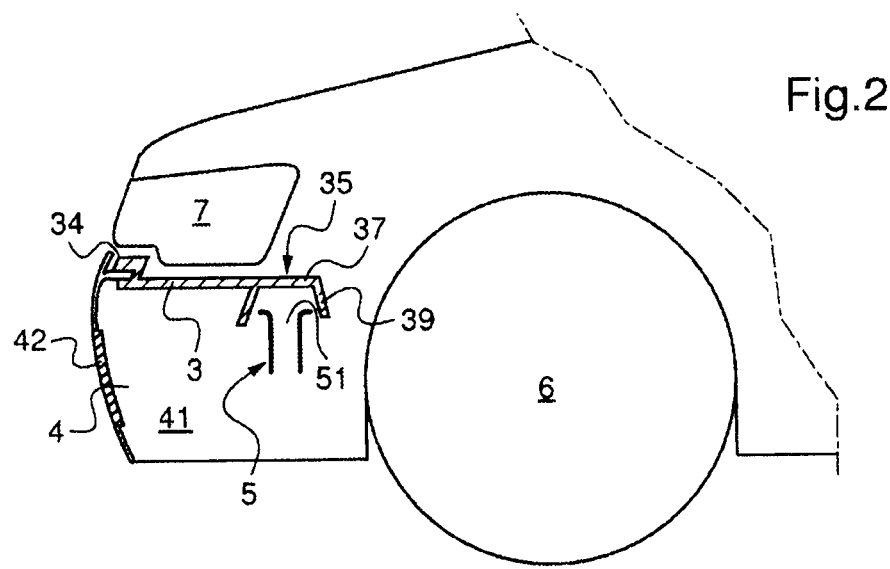
FIG. 2 depicts a schematic side view of a vehicle comprising the body according to the invention.

With reference to FIG. 2, the mount 3 also comprises a mounting portion 34 which extends in a direction perpendicular to the crossmember 1, forward thereof (that is to say in the direction away from the chassis frame side rail 2). This mounting portion 34 comprises clip-forming means that grip the wall of the bumper-forming element 4 in such a way as to keep it suspended in front of the crossmember 1. The bumper-forming element 4 effectively covers the length of the front crossmember 1 and has side walls 41 positioned in front of each of the two ends of the crossmember 1. These side walls 41 extend parallel to the chassis frame side rails, near the front wheels 6. These lateral walls 41 are situated under the headlights 7. The bumper-forming element 4 has openings 42 formed in its front wall which is parallel to the crossmember 1 (see FIG. 4). These openings 42 allow air from the outside to enter between the body and the bumper-forming element 4.

The open end 51 of the air duct 5 is situated in the protective portion 35 of the mount 3. This protective portion 35 is situated laterally with respect to the crossmember 1, in the continuation thereof, near the front wheel 6 of the vehicle. The protective portion 35 comprises an end wall 37 and edges 39 which extend along a portion of the duct 5 so as to cover the open end 51 of the duct adequately. The end wall 37 is positioned above the open end 51 and is distant therefrom. Likewise, the edges 39 are distant from the duct 5 so as to allow air to enter via the open end 51 of the duct 5. In the embodiment depicted, the open end 51 faces toward the floor of the vehicle, that is to say toward the upper face 12 of the crossmember 1 (see FIG. 1), so as to avoid direct ingress of water. However, this arrangement imposes no limitation on the invention.

Figure 3:
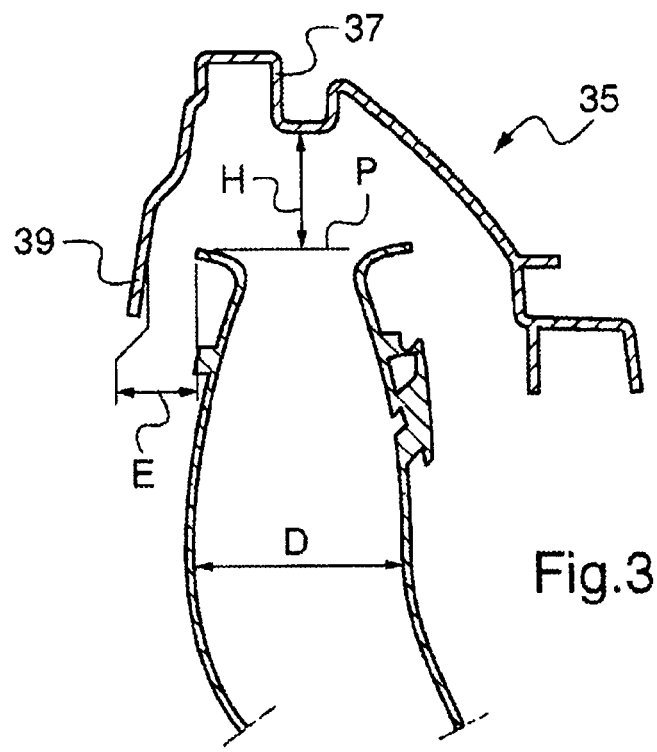
FIG. 3 depicts a view in section on a plane perpendicular to the chassis frame side rail and passing through the axis of the protective portion depicted in FIG. 1.

As depicted in FIG. 3, the protective portion 35 comprises an end wall 37 and two edges 39. In the embodiment depicted, the protective portion 35 is substantially cylindrical. The duct 5 has a maximum diameter D. The minimum distance separating the end wall 37 from the plane P in which the open end 51 is contained is defined as H. The minimum distance separating each of the edges 39 from the edge of the open end 51 is defined as E. The edges 39 extend over a portion of the duct 5, beyond the open end 51, so as to afford the latter adequate protection. The distance H is at least equal to 0.8 times the diameter D of the duct. For preference, H is substantially equal to D. The distance E is greater than 0.5 times the diameter D of the duct 5. In this instance, the edges 39 form part of a substantially cylindrical edge wall.

Figure 4:
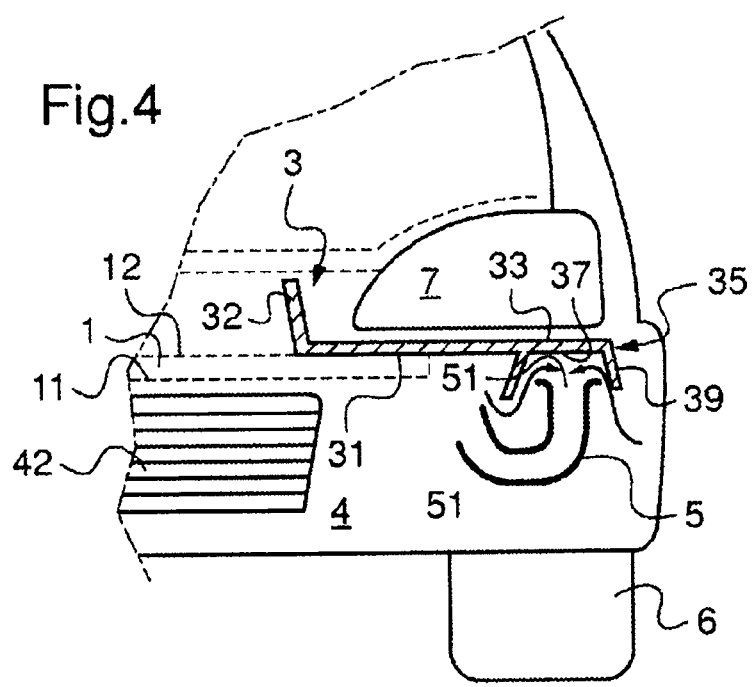
FIG. 4 depicts a partial front view of the body according to the invention, the bumper-forming element being mounted on the mount.

As depicted in FIG. 4, the bumper-forming element 4 has two baffle-forming openings 42 (a top one and a bottom one) which allow air from outside to enter the bumper-forming element 4 between the latter and the body of the vehicle.

The way in which the device of the invention works will now be explained with reference to FIG. 4.

Air from outside enters via the openings 42 in the bumper-forming element 4. It thus reaches the hollow region delimited by the bumper-forming element, in front of the front crossmember 1. The air circulates freely in this hollow region. Because the edges 39 and the end wall 37 of the protective portion 35 are far enough away from the duct 5, air can enter the duct 5 and thus be fed to the vehicle engine. If water manages to enter the bumper-forming element 4, this water cannot enter the duct 5 because of the protection afforded by the protective portion 35. Specifically, because of the edges 39 which surround the open end 51 of the duct 5 and which extend toward the second end of the duct 5 which is the end connected to the engine, any water arriving in the vicinity of the mount 3 in the form of a wave cannot enter the duct 5 between the latter and the edges 39.

The invention claimed is:

1. A motor vehicle body including a front end configured to accept a bumper-forming element to protect the front end, the body comprising:
    a front crossmember arranged transversely to the body, and defining the front end;
    a pair of mounts for the bumper-forming element, the mounts being fixed some distance apart, on the front crossmember, and each comprising a mounting part that extends in front of the front crossmember and serves to support the bumper-forming element; and
    an engine air intake duct, the duct comprising an open end via which air from outside enters the duct;
    wherein one of the mounts for the bumper-forming element comprises a protective portion protecting the open end, the protective portion is arranged in an immediate vicinity of the open end, the protective portion covering the open end and extending along a portion of the duct, and a space is left between the protective portion and the duct so as to allow air to enter the duct via the open end.

2. The body as claimed in claim 1, wherein the front crossmember includes an upper face facing toward the interior of a motor vehicle, and the open end faces toward the upper face.

3. The body as claimed in claim 1, wherein the duct includes an end connected to the engine, the protective portion includes an end wall positioned above the open end and an edge-forming wall connected to the end wall, and the edge-forming wall extends along the duct, beyond the open end, in a direction of the end connected to the engine.

4. The body as claimed in claim 2, wherein the duct includes an end connected to the engine, the protective portion includes an end wall positioned above the open end and an edge-forming wall connected to the end wall, and the edge-forming wall extends along the duct, beyond the open end, in a direction of the end connected to the engine.

5. The body as claimed in claim 3, wherein a minimum distance separating the end wall from the open end is greater than 0.8 times the diameter of the duct.

6. The body as claimed in claim 4, wherein a minimum distance separating the end wall from the open end is greater than 0.8 times the diameter of the duct.

7. The body as claimed in claim 3, wherein the distance separating the edge-forming wall from the duct is greater than half the diameter of the duct.

8. The body as claimed in claim 4, wherein the distance separating the edge-forming wall from the duct is greater than half the diameter of the duct.

9. The body as claimed in claim 5, wherein the distance separating the edge-forming wall from the duct is greater than half the diameter of the duct.

10. The body as claimed in claim 6, wherein the distance separating the edge-forming wall from the duct is greater than half the diameter of the duct.

* * * * *